US011108725B1

(12) United States Patent
Chung et al.

(10) Patent No.: US 11,108,725 B1
(45) Date of Patent: Aug. 31, 2021

(54) SOCIAL MEDIA MESSAGE COMPOSITION

(71) Applicant: Twitter, Inc., San Francisco, CA (US)

(72) Inventors: Wook Chung, San Francisco, CA (US); Jennifer Nakamura, San Francisco, CA (US); Kiryl Lashuk, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/729,218

(22) Filed: Dec. 27, 2019

Related U.S. Application Data

(60) Provisional application No. 62/785,456, filed on Dec. 27, 2018.

(51) Int. Cl.
| | |
|---|---|
| *G06F 15/16* | (2006.01) |
| *H04L 12/58* | (2006.01) |
| *G06Q 30/02* | (2012.01) |
| *G06N 3/08* | (2006.01) |
| *G06F 15/173* | (2006.01) |

(52) U.S. Cl.
CPC ............. *H04L 51/32* (2013.01); *G06N 3/08* (2013.01); *G06Q 30/0246* (2013.01); *G06Q 30/0254* (2013.01); *G06Q 30/0277* (2013.01)

(58) Field of Classification Search
CPC ............. H04L 51/32; G06Q 30/0246; G06Q 30/0254; G06Q 30/0277; G06N 3/08
USPC ........................................ 709/204, 205, 224
See application file for complete search history.

(56) References Cited

U.S. PATENT DOCUMENTS 9,361,322 B1 * 6/2016 Dutta .................... G06Q 30/00

OTHER PUBLICATIONS

"Add power to your posting" (Hootesuite platform web page), retrieved from the internet on Dec. 27, 2019 through the Internet Archive: Wayback Machine for date Jun. 14, 2018 at URL <https://web.archive.org/web/20180614233222/https:/hootsuite.com/platform/boosting#>, 1 page.
"Create Boosted Posts," published on the Facebook for Business website, retrieved from the internet on Dec. 27, 2019 at URL <https://www.facebook.com/business/help/347839548598012?id=352109282177656>, 5 pages.

(Continued)

*Primary Examiner* — Karen C Tang
(74) *Attorney, Agent, or Firm* — Fish & Richardson P.C.

(57) ABSTRACT

Methods, systems, and apparatus, including computer programs encoded on computer storage media, for posting messages on a social messaging platform. One of the methods includes providing a message composition interface; receiving a user request to include a promotion with a composed message; in response to the request, processing the content of the composed message and the user's profile on the social messaging platform to determine one or more social signals; computing an engagement score for each user in a pool of users, wherein the engagement score for each user indicates the likelihood that the user will engage with the message; selecting candidate users from the pool of users; selecting a plurality of target users from the candidate users based on a promotion value and the respective engagement scores; and posting the message on the platform including adding the message to a message stream associated with the selected target users.

23 Claims, 7 Drawing Sheets

(56) References Cited

OTHER PUBLICATIONS

"Hootsuite Launches Boost to Help Organizations Large and Small Extend the Reach of Organic Social Content," retrieved from the internet on Dec. 27, 2019 at URL <https://hootsuite.com/newsroom/press-releases/hootsuite-launches-boost-to-help-organizations-large-and-small-extend-the-reach-of-organic-social-content>, Jun. 13, 2018, 3 pages.

"The Difference Between Boosted Posts and Facebook Ads," published on the Facebook for Business website, retrieved from the internet on Dec. 27, 2019 at URL <https://www.facebook.com/business/help/317083072148603>, 5 pages.

* cited by examiner

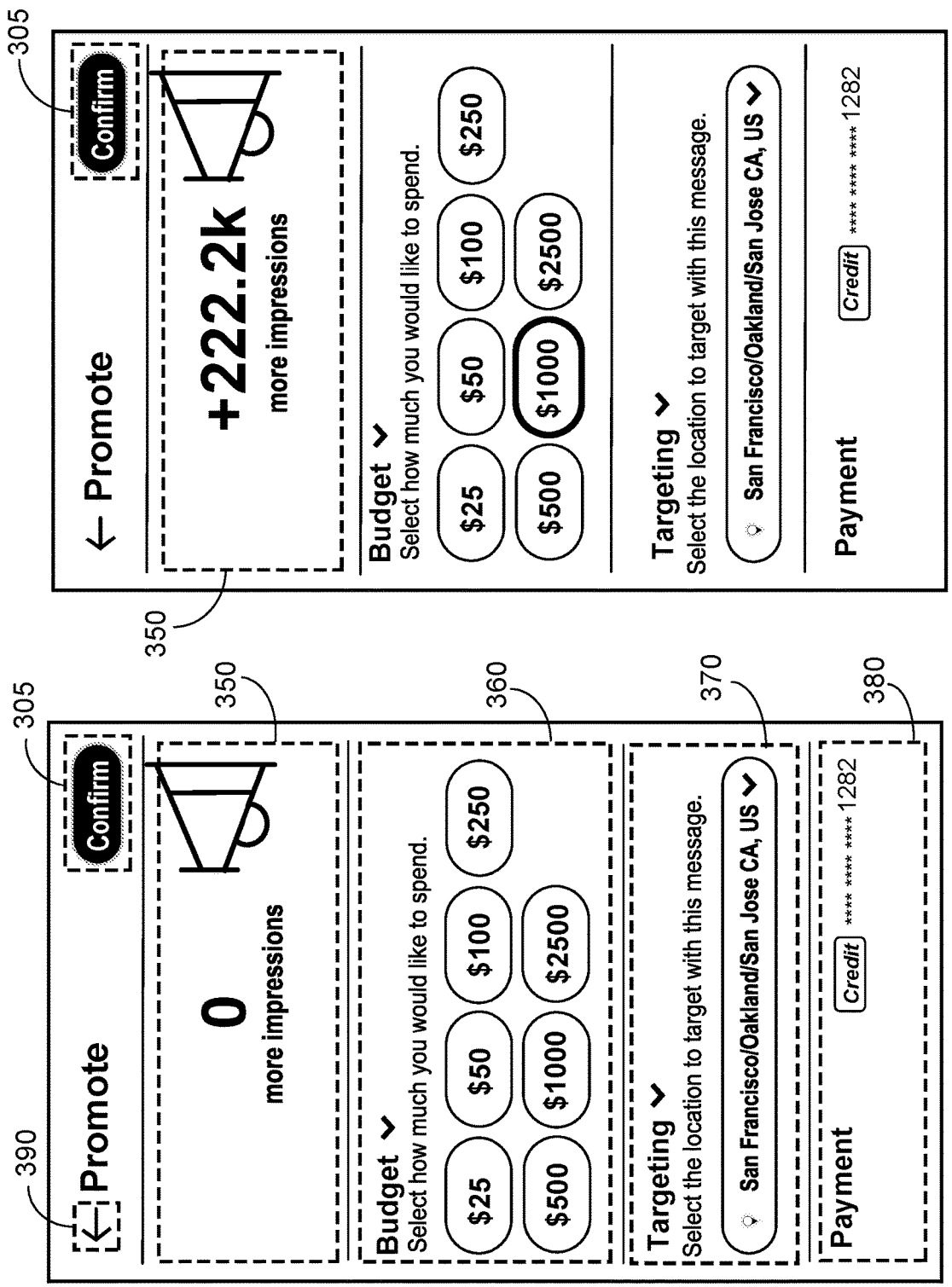

SOCIAL MEDIA MESSAGE COMPOSITION

CROSS-REFERENCE TO RELATED APPLICATIONS

This application claims the benefit under 35 U.S.C. § 119(e) of the filing date of U.S. Patent Application No. 62/785,456, for Social Media Message Composition, which was filed on Dec. 27, 2018, and which is incorporated here by reference.

BACKGROUND

This specification relates to composing and posting messages using a social networking platform.

Social messaging platforms and network-connected personal computing devices allow users to create and share content across multiple devices in real-time. Sophisticated mobile computing devices such as smartphones and tablets make it easy and convenient for people, companies, and other entities to use social networking messaging platforms and applications. Popular social messaging platforms generally provide functionality for users to draft and post messages, both synchronously and asynchronously, to other users. Other common features include the ability to post messages that are visible to one or more identified other users of the platform, or even publicly to any user of the platform without specific designation by the authoring user.

SUMMARY

This specification describes a system and method for posting messages authored on a social messaging platform to other users of the platform. Specifically, a user composes a message and during the composition process determines whether to post the message normally, e.g., to other users having a particular relationship with the user, or to promote the message more broadly. The platform obtains one or more social network signals from the message and the user. The platform analyzes the social signals to identify candidate target users on the social networking platform. A particular group of candidate target users is then selected based on a user specified promotion value. The platform delivers the message to a message stream of the selected target users. The platform can provide collected user engagement statistics for the message to the user.

In general, one innovative aspect of the subject matter described in this specification can be embodied in methods that include the actions of providing a message composition interface to a user associated with a social messaging platform; receiving, through the message composition interface, a user request to include a promotion with a composed message, the request including a promotion value; in response to the request, processing the content of the composed message and the user's profile on the social messaging platform to determine one or more social signals; identifying a pool of users of the social networking platform, wherein each user in the pool of users possesses at least one of the determined social signals; computing, for the message, an engagement score for each user in the pool of users, wherein the engagement score for each user indicates the likelihood that the user will engage with the composed message, and wherein the engagement score is calculated using the one or more social signals; selecting candidate users from the pool of users, wherein each of the candidate users possesses an engagement score greater than a specified threshold value; selecting a plurality of target users from the candidate users, wherein the selection is based on the promotion value and the respective engagement scores of the candidate users; and posting the message on the social messaging platform including adding the message to a message stream associated with the selected target users.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. Particular embodiments of the subject matter described in this specification can be implemented so as to realize one or more of the following advantages. A message authored on a social messaging platform can be promoted to additional target users during message composition. This provides a simplified way of promoting messages as compared to selecting previously posted messages to promote. The promoted message is posted to respective message streams of target users according to a promotion budget such that the message receives additional impressions and increased exposure. Target users, e.g., users on the social networking platform to whom the promoted message is directed to, are selected based on one or more social signals. User engagement data on the message can be relayed to the author in real-time or near real-time.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 3A-3F are example user interfaces for composing and posting a message on the social messaging platform.

DETAILED DESCRIPTION

Figure 1:
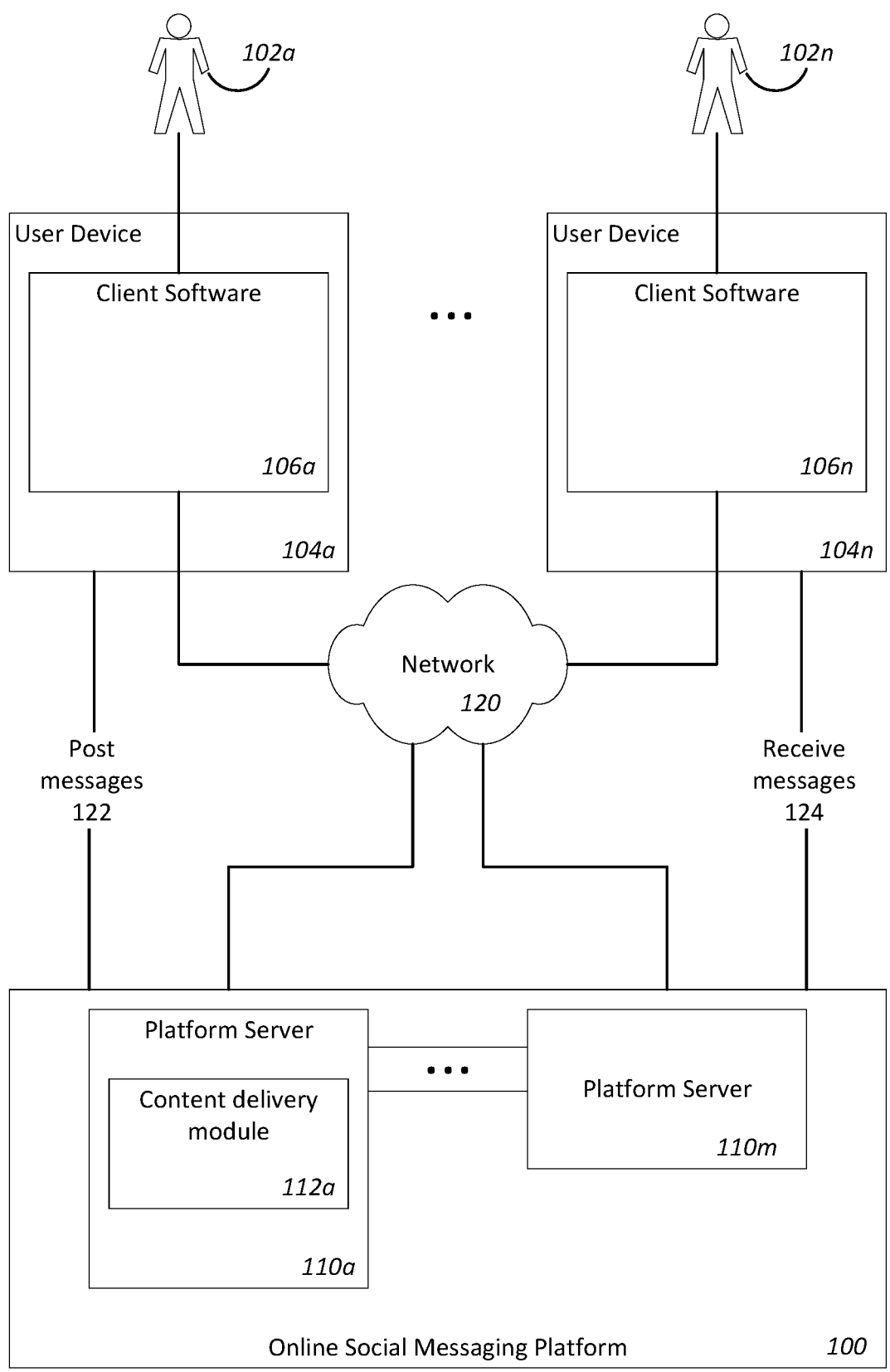
FIG. 1 illustrates an example online social messaging platform and example user devices configured to interact with the platform.

FIG. 1 illustrates an example online social messaging platform 100 and example user devices 104a-104n configured to interact with the platform over one or more data communication networks 120. The platform, the user devices, or both are configured, as will be described, to implement or perform one or more of the innovative technologies described in this specification.

The platform is implemented on one or more servers 110a-110m. Each server is implemented on one or more computers, e.g., on a cluster of computers. One or more of the servers implement content delivery modules 112a of the innovative technologies, which will be described later.

Users Users 102a-102n of the platform use user devices 104a-104n, on which client software 106a-106n is installed, to use the platform. Users can interact with the social messaging platform using the respective client software on their respective user devices.

A user may be account holder of an account, or an authorized user of an account, on the platform. The platform may have millions of accounts of individuals, businesses, or other entities, e.g., pseudonym accounts, novelty accounts, and so on.

In some implementations, the platform allows use of the platform by users who are not account holders or who are not logged in to an account of the platform. If the platform allows use by such users, the platform may allow such a user to post messages or to use other functionality of the platform by associating the user with a temporary account or identifier.

User Device and Client Software

A user device can be any Internet-connected device, e.g., a laptop or desktop computer, a smartphone, or an electronic tablet. The user device can be connected to the Internet through a mobile network, through an Internet service provider (ISP), or otherwise.

Each user device is configured with software, which will be referred to as a client or as client software 106a-106n, that in operation can access the platform so that a user can post and receive messages, view and curate the user's streams, and view and interact with lists of content items. On any particular user device, the client may be a web browser or an HTML (hypertext markup language) document rendered by a web browser. Or the client may be JavaScript code or Java code. Or the client may also be dedicated software, e.g., an installed app or installed application, that is designed to work specifically with the platform. Or the client may be or include a Short Messaging Service (SMS) interface, an instant messaging interface, an e-mail-based interface, or an API function-based interface, for example.

Platform

The social messaging platform 100 is implemented on one or more computers in one or more locations that operate as one or more servers that support connections over wired or wireless networks 120 from many different kinds of user devices. The platform may have many millions of accounts, and anywhere from hundreds of thousands to millions of connections may be established or in use between clients and the platform at any given moment.

The platform facilitates real-time communication. The platform and client software are configured to enable users to use the platform to post messages 122 to the platform and to use the platform to receive messages 124 posted by other users.

In some implementations, the platform provides facilities for users to send messages directly to one or more other users of the platform, allowing the sender and recipients to maintain a private exchange of messages.

The platform is configured to provide content, generally messages, to a user in a home feed message stream. The messages will generally be messages from accounts the user is following, meaning that the recipient has registered to receive messages posted by the followed account, and optionally content that such accounts have engaged with, e.g., endorsed.

Optionally, the platform is configured to include in a recipient user's home feed stream messages that the platform determines are likely to be of interest to the recipient, e.g., messages on topics of particular current interest, as represented by the number of messages posted on the topics platform users, or messages posted on the topics of apparent interest to the recipient, as represented by messages the recipient has posted or engaged with, as well as selected advertisements, public service announcements, promoted content, or the like.

The platform is configured to enable users to exchange messages in real-time, i.e., with a minimal delay. The platform is also configured to enable users to respond to messages posted earlier, on the order of hours or days or even longer. The platform is configured to display posted messages to one or more other users within a short time frame so as to facilitate what can essentially be a live conversation between the users.

Thus, the basic messaging functionality of the platform includes at least posting new messages, providing message streams on client request, managing accounts, managing connections between accounts, messages, and streams, and receiving engagement data from clients engaging with messages. The platform also indexes content items and access data and can provide the indexed data to account holders.

Messages

In some implementations of the platform, a message contains data representing content provided by the author of the message. The message may be a container data type storing the content data. The types of data that may be stored in a message include text, graphics, images, video, and computer code, e.g., uniform resource locators (URLs), for example. Messages can also include key phrases, e.g., hashtags, that can aid in categorizing or relating messages to topics. Messages can also include metadata that may or may not be editable by the composing account holder, depending on the implementation. Examples of message metadata include a time and date of authorship and a geographical location of the user device when it submitted the message. In some implementations, what metadata is provided to the platform by a client is determined by privacy settings controlled by the user or the account holder.

Messages composed by one account holder may reference other accounts, other messages, or both. For example, a message may be composed in reply to another message composed by another account. A message may also be composed by a user in reply to a message originally posted by the user. Messages may also be republications of a message composed by and received from another account. Generally, an account referenced in a message may appear as visible content in the message, e.g., the name of the account, and may also appear as metadata in the message. As a result, the referenced accounts can be interactive in the platform. For example, users may interact with account names that appear in their message stream to navigate to the message streams of those accounts. The platform also allows messages to be private; a private message will only appear in the message streams of the composing and recipient accounts.

In some implementations, messages are microblog posts, which differ from e-mail messages, for example, in that an author of a microblog post does not necessarily need to specify, or even know, who the recipients of the message will be.

Streams

A stream is a stream of messages on the platform that meet one or more stream criteria. A stream can be defined by the stream criteria to include messages posted by one or more accounts. For example, the contents of a stream for a requesting account holder may include one or more of (i) messages composed by that account holder, (ii) messages composed by the other accounts that the requested account holder follows, (iii) messages authored by other accounts that reference the requested account holder, or (iv) messages sponsored by third parties for inclusion in the account holder's message stream. The messages of a stream may be ordered chronologically by time and date of authorship, or reverse chronologically. Streams may also be ordered in other ways, e.g., according to a computationally predicted relevance to the account holder, or according to some combination of time and relevance score.

A stream may potentially include a large number of messages. For both processing efficiency and the requesting account holder's viewing convenience, the platform generally identifies a subset of messages meeting the stream criteria to send to a requesting client once the stream is generated. The remainder of the messages in the stream are maintained in a stream repository and can be accessed upon client request.

Relationships

Accounts will in general have relationships with other accounts on the platform.

Relationships between accounts of the platform are represented by connection data maintained by the platform, e.g., in the form of data representing one or more connection graphs. The connection data may be maintained in a connection repository. A connection graph includes nodes representing accounts of the platform and edges connecting the nodes according to the respective relationships between the entities represented by the nodes. A relationship may be any kind of association between accounts, e.g., a following, friending, subscribing, tracking, liking, tagging, or other relationship. The edges of the connection graph may be directed or undirected based on the type of relationship.

Engagement

In some implementations, the platform tracks engagement with messages. In some implementations, the platform maintains, in a message repository, data that describes each message as well as the engagement with each message.

Engagement data can include any type of information describing user activity related to a message by an engaging account of the platform. Examples of engagement by a user include, for example, reposting the message, marking the message to indicate is a favorite of, liked by, or endorsed by the user, responding to the message, and mentioning or referencing the message. Engagement data may also include how many followers, connections, and/or friends of the context account have connections with the engaging account, e.g., are in a connection graph of the engaging account, or an indication that the context account is a favorite account of the engaging account.

Engagement data can also include any type of information describing activity related to a context account by an engaging account of the platform. A context account is any account that a user, i.e., the engaging account, is engaging with. And engagement data relating to a context account can be data about engagement activity of that account or engagement activity by others with that account.

Services Provided by Platform Servers

The servers of the platform perform a number of different services that are implemented by software installed and running on the servers. The services will be described as being performed by software modules. In some cases, particular servers may be dedicated to performing one or a few particular services and only have installed those components of the software modules needed for the particular services. Some, modules will generally be installed on most or all of the non-special-purpose servers of the platform. The software of each module may be implemented in any convenient form, and parts of a module may be distributed across multiple computers so that the operations of the module are performed by multiple computers running software performing the operations in cooperation with each other. In some implementations, some of the operations of a module are performed by special-purpose hardware.

Front End Services

In some implementations, the platform includes numerous different but functionally equivalent front end servers, which are dedicated to managing network connections with remote clients.

The front end servers provide a variety of interfaces for interacting with different types of clients. For example, when a web browser accesses the platform, a web interface module in the front end module provides the client access. Similarly, when a client calls an API made available by the platform for such a purpose, an API interface provides the client access.

The front end servers are configured to communicate with other servers of the platform, which carry out the bulk of the computational processing performed by the platform as a whole.

Routing Services

A routing module stores newly composed messages in a message repository. The routing module also stores an identifier for each message. The identifier is used to identify a message that is to be included in a stream. This allows the message to be stored only once and accessed for a variety of different streams without needing to store more than one copy of the message.

Relationship Graph Services

A graph module manages connections between accounts. Connections determine which streams include messages from which accounts. In some implementations, the platform uses unidirectional connections between accounts and streams to allow account holders to subscribe to the message streams of other accounts. A unidirectional connection does not necessarily imply any sort of reciprocal relationship. An account holder who establishes a unidirectional connection to receive another account's message stream may be referred to as a "follower," and the act of creating the unidirectional connection is referred to as "following" another account.

The graph module receives client requests to create and delete unidirectional connections between accounts. In some implementations, these connections are stored in a relationship repository as part of a unidirectional connection graph. Each connection in the connection graph repository references an account in the account repository or a stream in the stream repository.

In the same or a different embodiment, the graph module can provide and manage bidirectional connections. In a bidirectional connection, both accounts are considered subscribed to each other's account message streams. The graph module stores bidirectional connections in the relationship repository. In some implementations, the platform and connection graph repository include both unidirectional and bidirectional connections.

Delivery Services

A delivery module constructs message streams and provides them to requesting clients, for example, through a front end server. Responding to a request for a stream, the delivery module either constructs the stream in real time, or accesses from a stream repository some or all of a stream that has already been generated. The delivery module stores generated streams in the stream repository. An account holder may request any of their own streams, or the streams of any other account that they are permitted to access based on security settings. If a stream includes a large number of messages, the delivery module generally identifies a subset of the messages to send to a requesting client, in which case the remainder of the messages are maintained in a stream repository and sent upon client request.

Account Services

An account module enable account holders to manage their platform accounts. The account module allows an account holder to manage privacy and security settings, and their connections to other account holders.

Generally, the platform does not require the account holder to provide a large amount of personal information. This personal information can include, for example, an account name, which is not necessarily a real name, an identifier, a user name, a picture, a brief description of themselves or the entity, an e-mail address, and a website. The personal information does not necessarily include, and may purposefully exclude, real-world identifying information like age, gender, interests, history, occupation, and so on. Information about each account is stored in an account repository.

Engagement Services

Client software allows account holders receiving a stream to engage, e.g., interact with, comment on, or repost, the messages in the stream. An engagement module receives these engagements and stores them in an engagement repository. Types of engagement include selecting a message for more information regarding the message, selecting a URI (universal resource identifier) or hashtag in a message, reposting the message, or making a message a favorite. Other example engagements types include opening a "card" attached to message, which presents additional content that is a target of a link in the message, or links to an application installed on the user device. Account holders may engage further with the additional content, e.g., by playing a video or audio file or by voting in a poll.

In addition to recording active interactions with messages through explicitly received user device input, the engagement module may also record passive interactions with messages. An impression occurs when a client presents the content of a message on a user device. Impression engagements include the mere fact that an impression occurred, as well as other information, e.g., whether a message in a stream appeared on a display of the user device, and how long the message appeared on the display.

Any engagement stored in the engagement repository may reference the messages, accounts, and/or stream involved in the engagement.

Engagements may also be categorized beyond their type. Example categories include engagements expressing a positive sentiment about a message ("positive engagements"), engagements expressing a negative sentiment about a message ("negative engagements"), engagements that allow an advertiser account to receive monetary compensation ("monetizable engagements"), engagements that are expected to result in additional future engagements ("performance engagements"), or connection engagements that are likely to result in one account holder following another account ("connection engagements"). The negative engagements category includes, for example, engagements dismissing a message or reporting a message as offensive while the positive engagements category typically includes engagements not in the negative engagements category. Example performance engagements include selecting a URL (uniform resource locator) in a message or expanding a card. Example monetizable engagements include, for example, engagements that result in an eventual purchase or a software application install on a user device. Generally, categories and types are not coextensive; a given type of engagement may fall into more than one category and vice versa.

Figure 2:
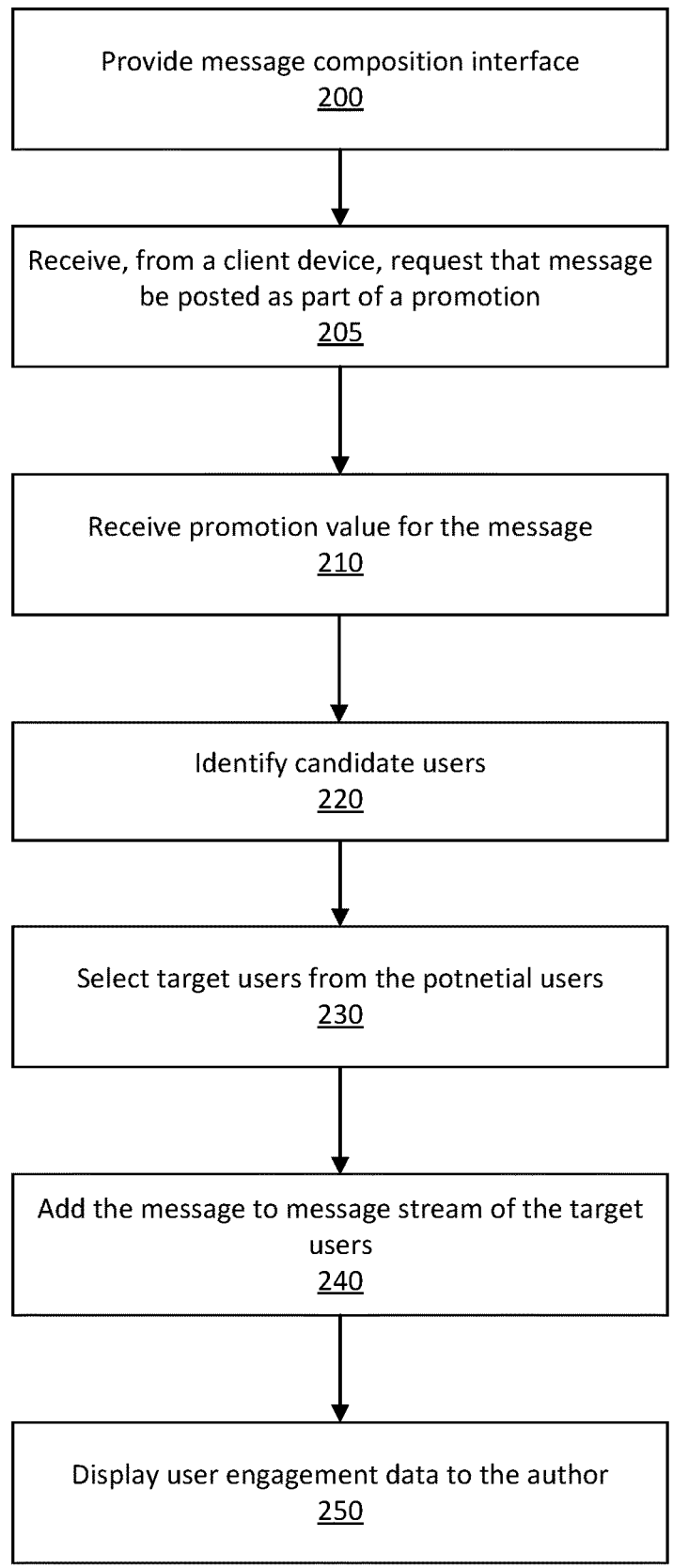
FIG. 2 is a flowchart of an example process for composing and posting a message on the social messaging platform.

FIG. 2 shows a flowchart of an example process for posting a promoted message to target users on a social messaging platform. For convenience, the process will be described as being performed by a system of one or more computers, located in one or more locations, and programmed appropriately in accordance with this specification. For example, a social messaging platform, e.g., the social messaging platform 100 of FIG. 1, appropriately programmed, can perform the process 200.

The system, through a client device, provides a message composition interface to authoring user for composing a message to be posted on a social messaging platform (200). The message can be in various digital forms, e.g., text strings, emoji strings, images, GIFs, audio files, or video files. The message can include various metadata, e.g., user location information, timestamp information, client device information, or memory size information. The message can also include various special syntax, e.g., searchable hashtags or reference links. The user interface can be provided by a web page associated with the system and displayed on the client device or by an application associated with the system executing on the client device. In some implementations, the system can receive information about content input to the composition interface prior to the user initiating a posting of the message to the system, for example, the interface can communicate what text the user has entered or information about the composing user, e.g., location.

The system receives a user input requesting that the message being composed be posted as part of a promotion (205). In some implementations, the user has an option to simply post the message, for example, to accounts have a specified graph relationship to the user, e.g., to followers of the user, or publicly to anyone that views the user's account. However, in some implementations the user can select to post the message including a promotion. For example, a user interface for composing the message can include different options for selecting a manner of posting the message including with or without promotion. Thus, a promotion can be added to a particular message during composition and prior to posting to the platform.

The system receives a promotion budget for the message (210). The promotion budget comprises a user-specified value of an amount of money payable to the social networking platform in return for additional message impressions, e.g., posting the message to a particular number of additional user accounts distinct from users having a specified graph relationship with the user.

On the system, a posted message will be added to the message stream of a limited number of users, e.g., users who are connected to the author on the social messaging platform according to a predefined graph relationship. For example, on a message may initially be posted to the author's followers, i.e., other users on messaging platform who have chosen to receive updates from the authoring account. However, as a promoted message, the message can receive additional impressions from users who are not connected to the authoring user.

The system identifies candidate users on the social networking platform who, based on the calculation of the system, have at least a threshold likelihood to engage with the promoted message (220). For example, the system can identify candidate users with at least an estimated ten percent chance of engaging with the message, e.g., by reposting or liking the message. Identifying the candidate users is described below with respect to FIG. 4.

The system selects target users from the candidate users (230). For example, the number of target users selected by the system can be based on particular promotion parameter values, for example, a size of the promotion budget. A larger promotion budget can result in more target users for the promoted message. Selecting target users from the candidate users is described in greater detail below with respect to FIG. 4.

In some implementations, the author, instead of the system, can perform the selection of the target users. For example, the system can place the candidate users in multiple groups, and display average user data for each group to the author through a user interface. This average user data can indicate a group having a particular relevance score indicating a likelihood that users of the group will engage with the promoted message. For a given budget, there can be a tradeoff between number of impressions and the relevance score. For example, the higher the relevance score, the smaller the group of users and vice versa. The author can select a particular group of candidate users based on the author's preference for the group's average user data. Placing the candidate users in groups and displaying average user data per group is described below with respect to FIG. 4.

The system adds the message to respective message streams of the target users (240). For example, on a social messaging platform that implements a timeline, the message can be associated with the timeline of each target user such that the message may be presented to the user when they view a timeline generated from their message stream, e.g., at the top of a target user's timeline or at a location in reverse chronological order with respect to other received messages on their timeline. In some implementations, the promoted message appears with distinguishing features, e.g., a label, to inform the target users of the message's promotion nature.

In some implementations, the system can provide a display of a current budget balance and the number of message impressions in real-time to the author, for example, in response to a user request to view activity associated with the posted message. The author can suspend or terminate the delivery of the promoted message at any time before the budget balance is reduced to zero.

The system provides real-time user engagement data to the author (250). For example, the user can access a user interface provided by the messaging platform related to the user's promoted messages to view user engagement data. The user engagement data can provide various metrics on how the target users have reacted to the promoted message. For example, the user engagement data can include an impression-to-repost rate, e.g., a ratio of the number of user rebroadcasts to the number of user impressions. User engagement data can also include the number of likes or replies to the promoted message from the target users.

FIGS. 3A-3F show example user interfaces on a client device for composing and posting a promoted message on the social messaging platform.

In some implementations, the user interface includes the functionality to compose a message. For example, in FIG. 3A, the author enters the text "Let's promote this message here!" in the message input box 300. The text message can be entered in any supported language and with any supported symbols. The author can select the post button 340 to broadcast the message to followers. The author can optionally upload additional content to accompany the text message. For example, in FIG. 3A, the author can upload media content, e.g., an image, by selecting the media upload button 310.

Figure 3B:
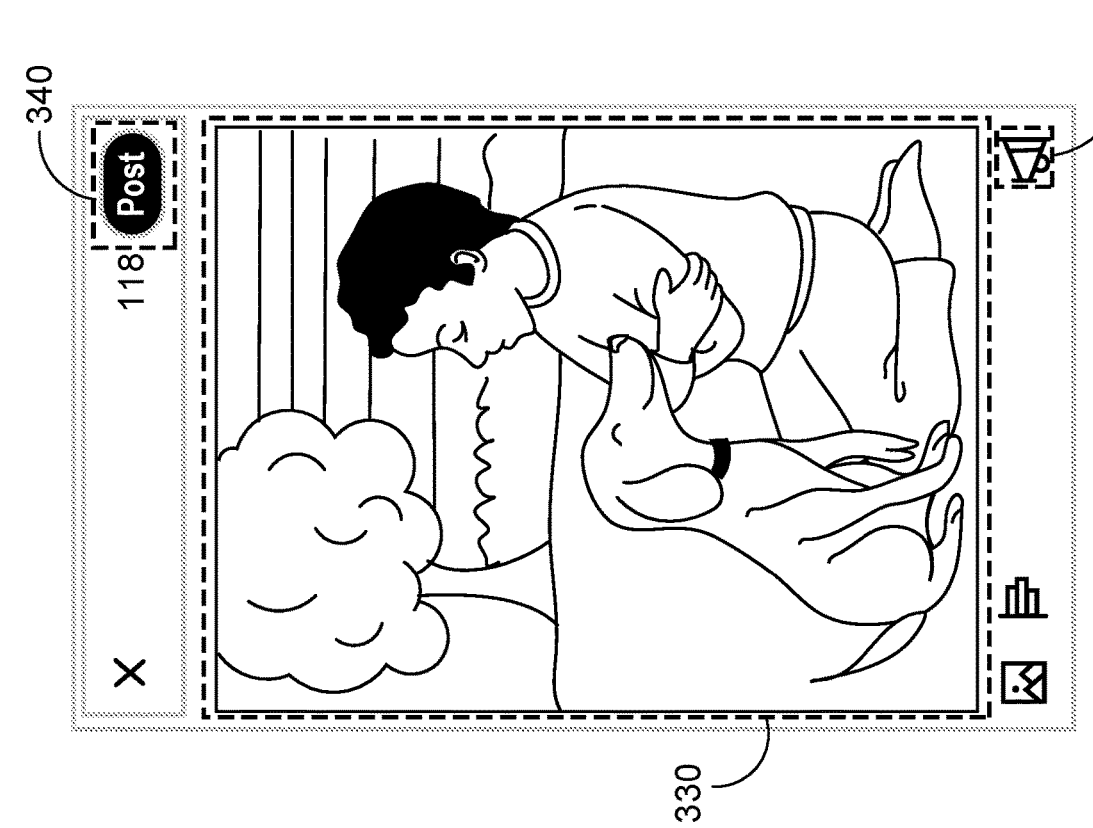

FIG. 3B shows an example user interface provided in response to a selection of the media button 310. The author can upload media content from local device or from online resources. The author can preview the uploaded media in a media preview window 330, in this example showing an uploaded image.

The author can post the text content and the accompanying image as a message by selecting the post button 340. Optionally, the author can select a promotion budget for the message by selecting the promotion button 320 shown in both FIGS. 3A and 3B. The promotion can expose the message to more users on the social messaging platform that do not have a prior relationship, e.g., a predefined graph relationships, with the authoring user.

FIG. 3C shows an example user interface provided in response to a selection of the promotion button 320. The user interface includes an impression statistics window 350 that shows an estimation of impressions for the message based on the selected promotion budget. If no promotion budget is selected, the impression statistics window 350 will display "0 more impressions."

The user interface of FIG. 3C also includes a budget window 360. The budget window 360 displays the promotion budget selected by the author. For example, the budget window 360 shows a plurality of user interface elements corresponding to a plurality of promotion budget amounts ranging from $25 to $2500. In some implementations, the budget window 360 also includes the functionality to receive a user-specified promotion budget amount.

The user interface of FIG. 3C also includes a filter window 370. In some implementations, the author can enter one or more filtering conditions in the filter window 370 to limit the scope of the candidate users. For example, the author can choose to filter candidate users based on user location, gender, job title, etc. In FIG. 3C, the author has entered the location-based filtering condition "San Francisco/Oakland/San Jose Calif., US." As a result, the candidate target users will be limited to users based in these areas.

The user interface of FIG. 3C also includes a payment method window 380. The payment method window 380 in FIG. 3C shows the stored payment method. For example, as indicated in FIG. 3C, the author has previously entered credit card information. The author can choose to use a different existing payment method or add a new payment method.

Figure 3A:
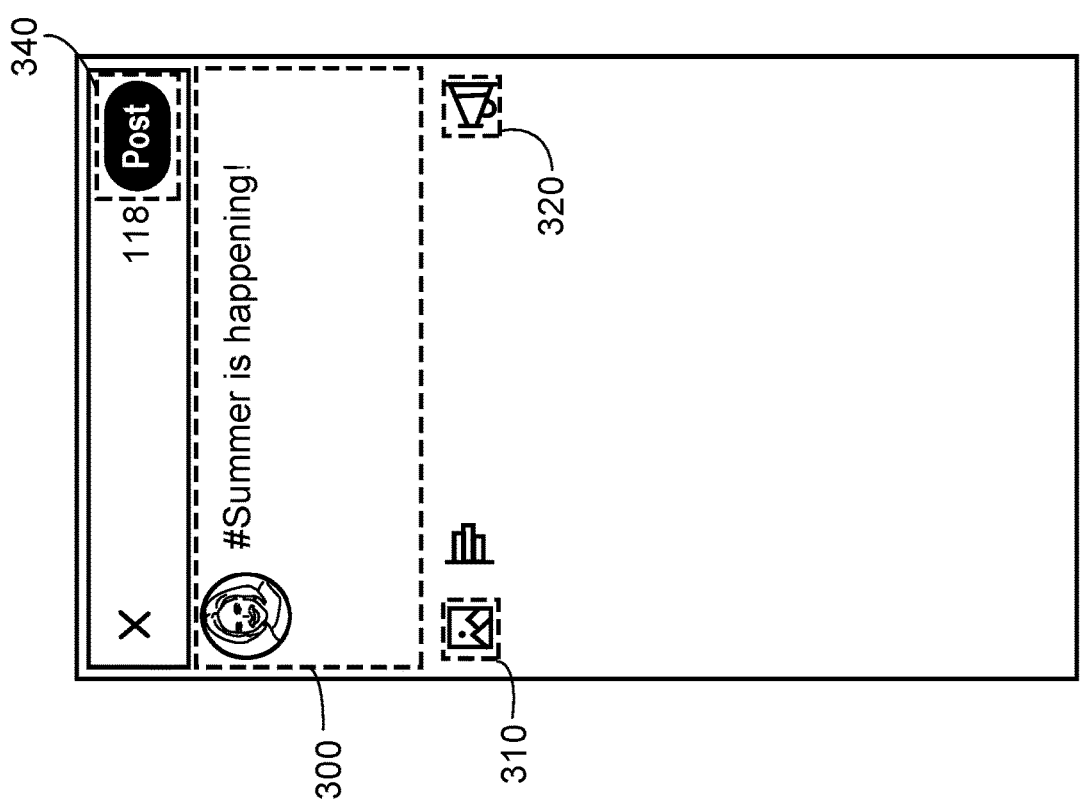

If the author no longer wishes to attach a promotion budget to the message, the author can select the back button 390 to return to the message composition user interface shown in FIG. 3A or 3B.

In response to an author selection of a particular budget in the budget window 360, the impression statistics window 350 displays the estimated number of additional impressions for the message given the selected budget. For example, in FIG. 3D, the user interface element corresponding to a $1000 promotion budget is selected. The impression statistics window 350 shows that the message will receive an estimated additional 222,200 impressions on presented account timelines of the platform. If the author is satisfied with the result, the author can select the confirm button 305.

Figure 3F:
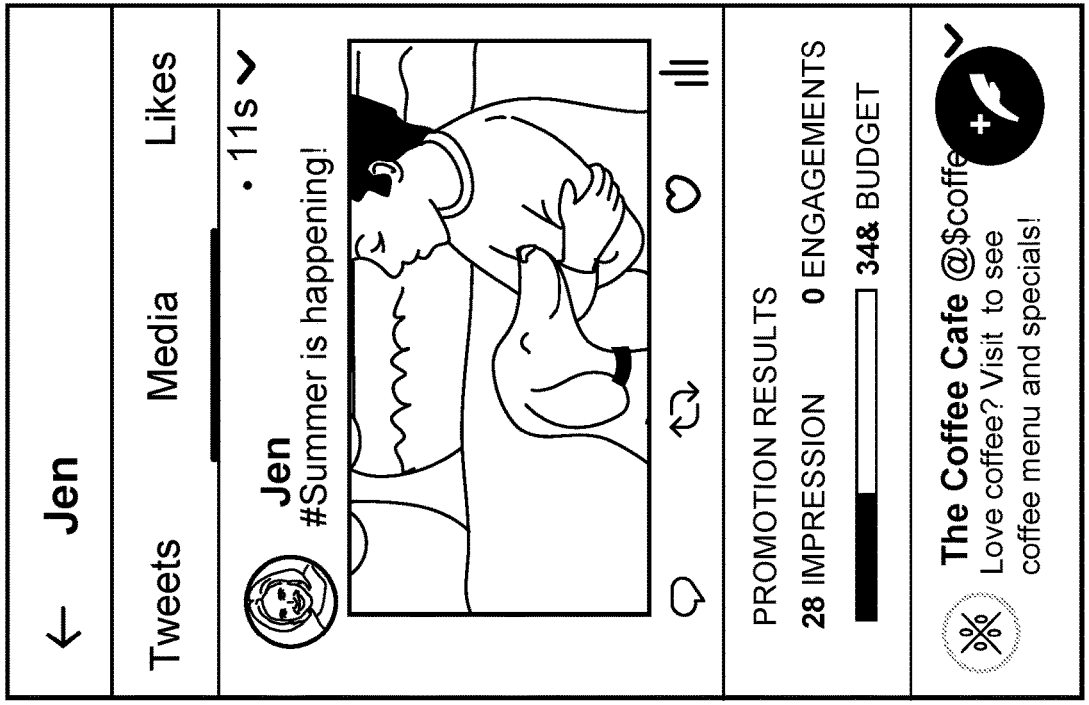
Figure 3E:

In response to an author selection of the confirmation button 305, a user interface as shown in FIG. 3E is provided for display to the user. The author is able to preview the text message and the additional content. The user interface element 315 indicates that the message is a promoted message and the budget associated with the message includes $1000.

FIG. 3F shows an example user interface provided in response to a selection of the post and promote button 315 to post the message. The author can, e.g., on the author's timeline, view the content of the message, the impression and engagement data of the message, and the remaining promotion budget.

Figure 4:
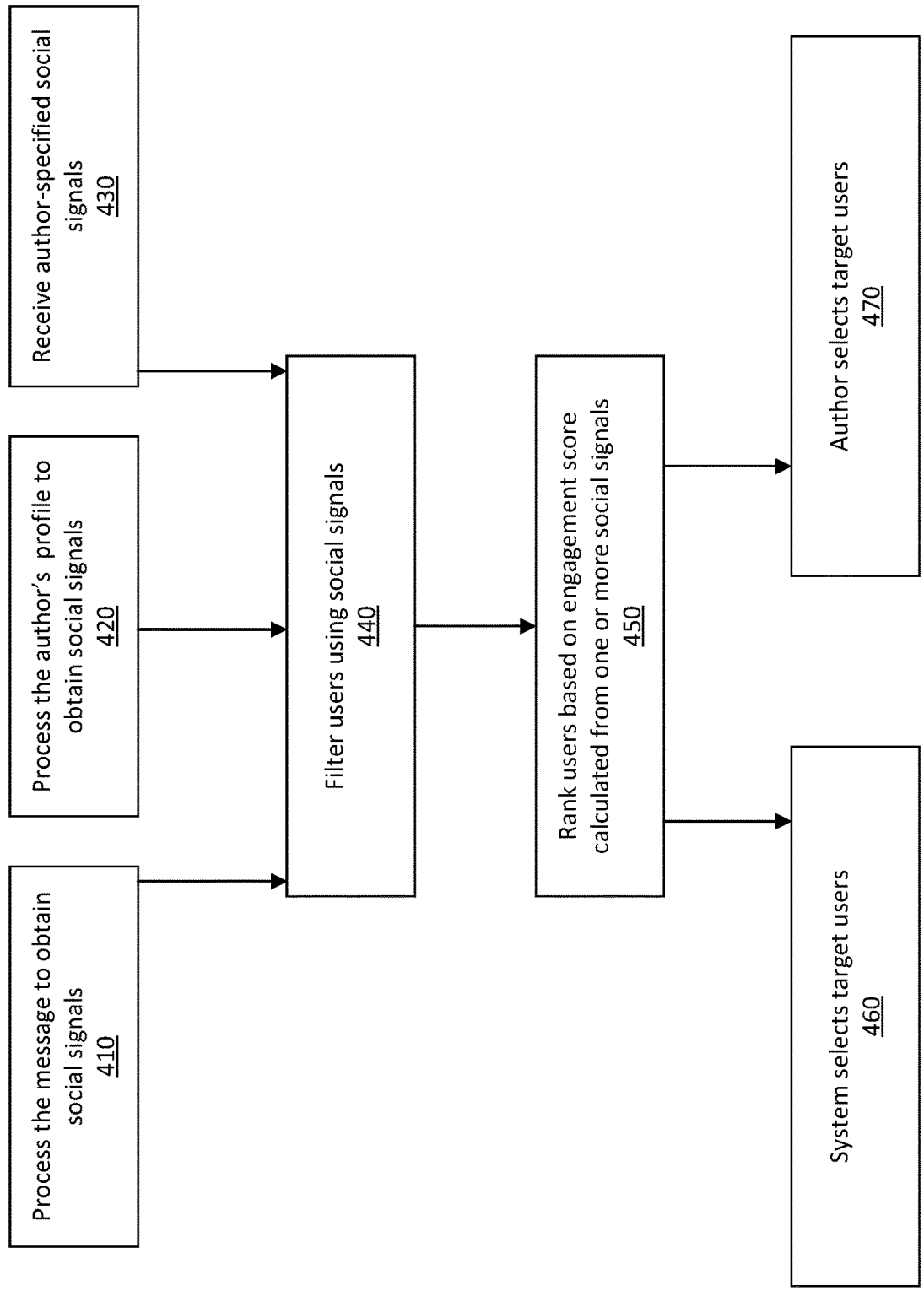
FIG. 4 is a flowchart of an example process for selecting users on a social messaging platform to receive the promoted message.

FIG. 4 shows a flowchart of an example process used by the system to select target users on a social networking platform to receive the promoted message. For convenience, the process will be described as being performed by a system of one or more computers, located in one or more locations, and programmed appropriately in accordance with this specification. For example, a social messaging platform, e.g., the social messaging platform 100 of FIG. 1, appropriately programmed, can perform the process 200.

The goal of the selection is to identify target users who possess at least a threshold likelihood to engage with the message. User engagements can include any actions taken by a user to increase the influence of a message on the social networking platform. For example, a user can engage with a message by reposting, liking, or commenting on a message.

In some implementations, the system estimates the likelihood of user engagement with a message by using one or more social signals. Social signals can include any suitable informative or communicative signals that provide information on users accounts, user interactions, user relations, or messages on a social networking platform. For example, the number of a user's followers or the organization to which the user belongs can serve as social signals. The system can obtain one or more social signals from various sources.

In some implementations, the system processes the message to obtain message-specific social signals (410). For example, the system can employ one or more natural language processing algorithms to analyze the textual content of the message. The system can extract social signals such as the topic of the message, the tone of the message, or future actions anticipated by the message. The system can also employ additional algorithms to analyze the non-textual content of the message, such as a neural network for image or audio processing, to obtain additional social signals.

In some implementations, the system uses the author's social networking profile to obtain author-specific social signals (420). For example, the system can access the account repository 146 to obtain the author's location, organization, gender or other information provided by the user to the social networking platform. In another example, the system can access the message repository 140 to obtain the author's previously sent or received messages. In another example, the system can access the connection graph repository 142 to obtain the author's social networking connections.

In some implementations, the system can receive additional social signals from the author's input (430). For example, the author can specify certain limitations on the message's potential recipients, e.g., location. In another example, the author can specify a time window for posting the message to target user's message streams.

In some implementations, the system filters accounts of users on the platform with one or more social signals to identify the message's candidate recipients (440). For example, the system can select a first pool of users by determining that each user in the first pool of users possesses at least one of the social signals.

In some implementations, the system ranks users in the first pool based on an engagement score, which indicates the likelihood that a user will engage with a message (450). For example, the system can calculate the engagement score based on a weighted vector of social signals, with each weight representing the importance of the associated social signal. In some examples, the system can determine the weights using an artificial neural network model trained with previously-obtained user engagement data. Alternatively, the weights can have hard-coded values. The system can perform the calculation using a variety of models, including weighted average, Bayesian classifiers, cluster analysis, decision trees, and artificial neural networks. The system can then identify candidate users from the pool that possess engagement score above a certain threshold value. In some examples, the threshold value is determined by finding a specific percentile of the ranked engagement scores of the first pool of users.

In some implementations, the system selects a number of target users from the candidate users based on the size of the promotion budget (460). The selection can be performed using a variety of algorithms. For example, the system can select a group of top-ranked users.

In some implementations, the system allows the author to select a group of target users from the candidate recipients (470). For example, the system can put the candidate users in multiple groups with average user information for each group shown to the author. For example, the system can place the candidate users in multiple groups, and display average user data for each group to the author through a user interface. This average user data can indicate a group having a particular relevance score indicating a likelihood that users of the group will engage with the promoted message. For a given budget, there can be a tradeoff between number of impressions and the relevance score. For example, some groups may have more candidate users but lower average engagement score per user, corresponding to a choice of more impressions but lower probability of engagement per impression. Although the author does not choose individual users, the author can select a particular group of users based on the author's preferences.

Figure 5:
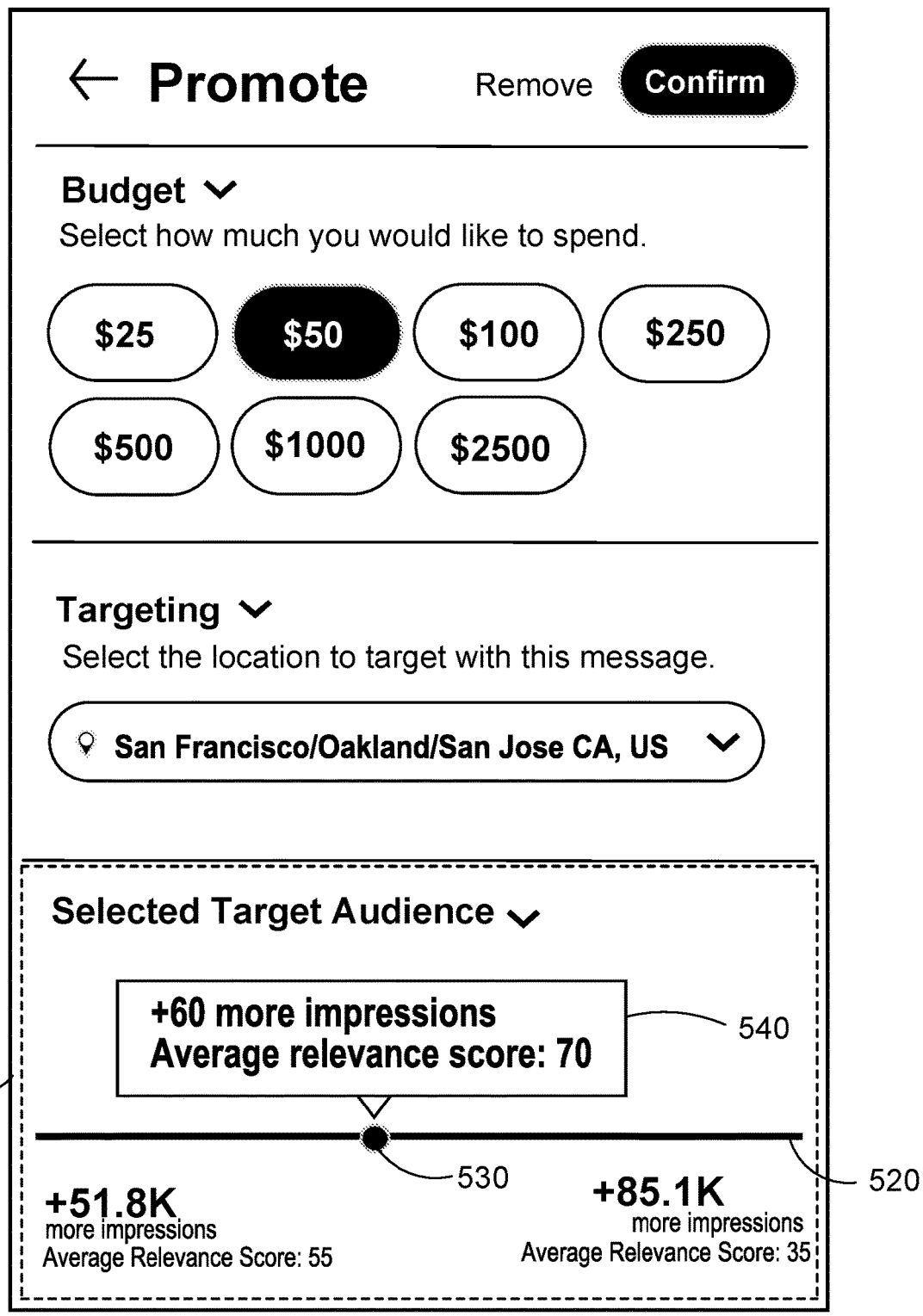
FIG. 5 is an example user interface for selecting users to receive the promoted message. Specific embodiments of the invention will now be described in detail with reference to the accompanying figures. Like elements in the various figures are denoted by like reference numerals for consistency.

FIG. 5 shows an example user interface including a selection window 510 that allows the author to select a particular group of target users to broadcast the message to. The selection window 510 includes a sliding scale 520. A point 530 on the sliding scale 520 corresponds to a particular group of target users. Different points on the sliding scale 520 correspond to target users with different size and different engagement score. The information box 530 shows the size and engagement score of a group corresponding to the selected point on the sliding scale 520. For example, FIG. 5 shows that the author has selected a group of target users with group size of 60,000 and average engagement score of 70.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially generated propagated signal, e.g., a machine generated electrical, optical, or electromagnetic signal, that is generated to encode information for transmission to suitable destination apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) destination, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To send for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can send input to the computer. Other kinds of devices can be used to send for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet. The computing system can include clients and servers. A client and server are generally remote from each other and typically interact through a communication network. The relationship of client and server arises by virtue of computer programs running on the respective computers and having a client-server relationship to each other.

In addition to the embodiments of the attached claims and the embodiments described above, the following embodiments are also innovative:

Embodiment 1 is a method comprising: providing a message composition interface to a user associated with a social messaging platform; receiving, through the message composition interface, a user request to include a promotion with a composed message, the request including a promotion value; in response to the request, processing the content of the composed message and the user's profile on the social messaging platform to determine one or more social signals; identifying a pool of users of the social networking platform, wherein each user in the pool of users possesses at least one of the determined social signals; computing, for the message, an engagement score for each user in the pool of users, wherein the engagement score for each user indicates the likelihood that the user will engage with the composed message, and wherein the engagement score is calculated using the one or more social signals; selecting candidate users from the pool of users, wherein each of the candidate users possesses an engagement score greater than a specified threshold value; selecting a plurality of target users from the candidate users, wherein the selection is based on the promotion value and the respective engagement scores of the candidate users; and posting the message on the social messaging platform including adding the message to a message stream associated with the selected target users.

Embodiment 2 is the method of embodiment 1 further comprising obtaining user engagement data, wherein the user engagement data indicates the respective engagements of the plurality of target users; and providing the user engagement data to the first user.

Embodiment 3 is the method of any one of embodiments 1 through 2, further comprising receiving one or more filtering criteria from the user including one or more of location filtering or time filtering.

Embodiment 4 is the method of any one of embodiments 1 through 3, wherein computing the engagement score comprises: determining a weight for each of the one or more social signals, wherein the weight indicates the relative importance of the respective social signal, and wherein the weight is determined dynamically based on all the social signals; and computing, for each user in the pool of users, a weighted average using all the social signals and respective weights.

Embodiment 5 is the method of any one of embodiments 1 through 4, wherein the weights are updated by an artificial neural network using previously recorded user engagement data as training data.

Embodiment 6 is the method of any one of embodiments 1 through 5, wherein selecting the one or more target users further comprises: generating a plurality of groups of candidate users, each group comprising users having a similar likelihood of engagement; and receiving a user input selecting a group of the plurality of groups.

Embodiment 7 is the method of any one of embodiments 1 through 6, wherein generating the groups includes using the promotional amount to determine the number of users to include in a group having a particular likelihood of engagement, wherein the number of users in the group is inversely proportional to the likelihood of engagement.

Embodiment 8 is a system comprising: one or more computers and one or more storage devices storing instructions that are operable, when executed by the one or more computers, to cause the one or more computers to perform the method of any one of embodiments 1 to 7.

Embodiment 9 is a computer storage medium encoded with a computer program, the program comprising instructions that are operable, when executed by data processing apparatus, to cause the data processing apparatus to perform the method of any one of embodiments 1 to 7.

Embodiment 10 is a method comprising: providing a message composition interface to a user associated with a social messaging platform; receiving, through the message composition interface, a user request to include a promotion with a composed message, the request including a promotion value; in response to the request, computing, for the message, an engagement score for each user in a pool of users, wherein the engagement score for each user indicates the likelihood that the user will engage with the composed message, and wherein the engagement score is calculated using the one or more social signals; selecting candidate users from the pool of users, wherein each of the candidate users possesses an engagement score greater than a specified threshold value; selecting a plurality of target users from the candidate users, wherein the selection is based on the promotion value and the respective engagement scores of the candidate users; and posting the message on the social messaging platform including adding the message to a respective message stream associated with each of the selected target users.

Embodiment 11 is the method of embodiment 10 further comprising obtaining user engagement data, wherein the user engagement data indicates the respective engagements of the plurality of target users; and providing the user engagement data to the first user.

Embodiment 12 is the method of any one of embodiments 10 through 11, further comprising receiving one or more filtering criteria from the user including one or more of location filtering or time filtering.

Embodiment 13 is the method of any one of embodiments 10 through 12, wherein computing the engagement score comprises: determining a weight for each of one or more social signals, wherein the weight indicates the relative importance of the respective social signal, and wherein the weight is determined dynamically based on all the social signals; and computing, for each user in the pool of users, a weighted average using all the social signals and respective weights.

Embodiment 14 is the method of any one of embodiments 10 through 13, wherein selecting the one or more target users further comprises: generating a plurality of groups of candidate users, each group comprising users having a similar likelihood of engagement; and receiving a user input selecting a group of the plurality of groups.

Embodiment 15 is the method of any one of embodiments 10 through 14, wherein generating the groups includes using the promotional amount to determine the number of users to include in a group having a particular likelihood of engagement, wherein the number of users in the group is inversely proportional to the likelihood of engagement.

Embodiment 16 is a system comprising: one or more computers and one or more storage devices storing instructions that are operable, when executed by the one or more computers, to cause the one or more computers to perform the method of any one of embodiments 10 to 15.

Embodiment 17 is a computer storage medium encoded with a computer program, the program comprising instructions that are operable, when executed by data processing apparatus, to cause the data processing apparatus to perform the method of any one of embodiments 10 to 15.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
providing a message composition interface to a user associated with a social messaging platform, wherein the message composition interface includes a first region for receiving message content, a first graphical element to post a composed message to the social messaging platform, and a second graphical element to request that the composed message be associated with a promotion prior to posting the composed message to the social messaging platform;
receiving, a request to associate a promotion with a message composed in the first region, wherein the request comprises setting a user specified promotion value;
in response to the request,
computing, for the composed message, an engagement score for each user in a pool of users, wherein the engagement score for each user indicates a likelihood that the user will engage with the composed message, and wherein the engagement score is calculated using one or more social signals;
selecting candidate users from the pool of users, wherein each of the candidate users possesses an engagement score greater than a specified threshold value; and
selecting a plurality of target users from the candidate users, wherein the selection is based on the user specified promotion value and the respective engagement scores of the candidate users, wherein the number of users in the selected plurality of target users is based on the respective engagement scores; and
receiving a user confirmation of the promotion, and in response, posting the message composed within the message composition interface and associated with the promotion on the social messaging platform including associating the message with accounts of one or more of the selected target users.

2. The method of claim 1, further comprising:
obtaining user engagement data, wherein the user engagement data indicates the respective engagements of the plurality of target users; and providing the user engagement data to the user.

3. The method of claim 1, further comprising:
receiving one or more filtering criteria from the user including one or more of location filtering or time filtering.

4. The method of claim 1, wherein computing the engagement score comprises:
determining a weight for each of the one or more social signals, wherein the weight indicates the relative importance of the respective social signal, and wherein the weight is determined dynamically based on all the social signals; and
computing, for each user in the pool of users, a weighted average using all the social signals and respective weights.

5. The method of claim 4, wherein the weights are updated by an artificial neural network using previously recorded user engagement data as training data.

6. The method of claim 1, wherein selecting the plurality of target users further comprises:
generating a plurality of groups of candidate users, each group comprising users having a similar likelihood of engagement; and
receiving a user input selecting a group of the plurality of groups.

7. The method of claim 6, wherein generating the plurality of groups includes using the promotion value to determine the number of users to include in a group having a particular likelihood of engagement, wherein the number of users in the group is inversely proportional to the likelihood of engagement.

8. The method of claim 1, wherein each user in the pool of users on the social messaging platform does not have a prior relationship with the user.

9. A system comprising: one or more computers and one or more storage devices storing instructions that are operable, when executed by the one or more computers, to cause the one or more computers to perform operations comprising:
providing a message composition interface to a user associated with a social messaging platform, wherein the message composition interface includes a first region for receiving message content, a first graphical element to post a composed message to the social messaging platform, and a second graphical element to request that the composed message be associated with a promotion prior to posting the composed message to the social messaging platform;
receiving, a request to associate a promotion with a message composed in the first region, wherein the request comprises setting a user specified promotion value;
in response to the request,
computing, for the composed message, an engagement score for each user in a pool of users, wherein the engagement score for each user indicates a likelihood that the user will engage with the composed message, and wherein the engagement score is calculated using one or more social signals;
selecting candidate users from the pool of users, wherein each of the candidate users possesses an engagement score greater than a specified threshold value; and
selecting a plurality of target users from the candidate users, wherein the selection is based on the user specified promotion value and the respective engagement scores of the candidate users, wherein the number of users in the selected plurality of target users is based on the respective engagement scores; and
receiving a user confirmation of the promotion, and in response, posting the message composed within the message composition interface and associated with the promotion on the social messaging platform including associating the message with accounts of one or more of the selected target users.

10. The system of claim 9, wherein the one or more computers and one or more storage devices store instructions that are further operable, when executed, to cause the one or more computers to perform operations comprising:
obtaining user engagement data, wherein the user engagement data indicates the respective engagements of the plurality of target users; and providing the user engagement data to the user.

11. The system of claim 9, where the one or more computers and one or more storage devices store instructions that are further operable, when executed, to cause the one or more computers to perform operations comprising:
receiving one or more filtering criteria from the user including one or more of location filtering or time filtering.

12. The system of claim 9, wherein computing the engagement score comprises:
determining a weight for each of the one or more social signals, wherein the weight indicates the relative importance of the respective social signal, and wherein the weight is determined dynamically based on all the social signals; and
computing, for each user in the pool of users, a weighted average using all the social signals and respective weights.

13. The system of claim 12, wherein the weights are updated by an artificial neural network using previously recorded user engagement data as training data.

14. The system of claim 9, wherein selecting the plurality of target users further comprises:
generating a plurality of groups of candidate users, each group comprising users having a similar likelihood of engagement; and
receiving a user input selecting a group of the plurality of groups.

15. The system of claim 14, wherein generating the plurality of groups includes using the promotion value to determine the number of users to include in a group having a particular likelihood of engagement, wherein the number of users in the group is inversely proportional to the likelihood of engagement.

16. The system of claim 9, wherein each user in the pool of users on the social messaging platform does not have a prior relationship with the user.

17. One or more computer storage media encoded with a computer program, the program comprising instructions that are operable, when executed by data processing apparatus, to cause the data processing apparatus to perform operations comprising:
providing a message composition interface to a user associated with a social messaging platform, wherein the message composition interface includes a first region for receiving message content, a first graphical element to post a composed message to the social messaging platform, and a second graphical element to request that the composed message be associated with a promotion prior to posting the composed message to the social messaging platform;
receiving, a request to associate a promotion with a message composed in the first region, wherein the request comprises setting a user specified promotion value;
in response to the request,
computing, for the composed message, an engagement score for each user in a pool of users, wherein the engagement score for each user indicates a likelihood that the user will engage with the composed message, and wherein the engagement score is calculated using one or more social signals;
selecting candidate users from the pool of users, wherein each of the candidate users possesses an engagement score greater than a specified threshold value; and
selecting a plurality of target users from the candidate users, wherein the selection is based on the user specified promotion value and the respective engagement scores of the candidate users, wherein the number of users in the selected plurality of target users is based on the respective engagement scores; and
receiving a user confirmation of the promotion, and in response, posting the message composed within the message composition interface and associated with the promotion on the social messaging platform including associating the message with accounts of one or more of the selected target users.

18. The computer storage media of claim 17, wherein the program comprises instructions to further cause the data processing apparatus to perform operations comprising:
obtaining user engagement data, wherein the user engagement data indicates the respective engagements of the plurality of target users; and providing the user engagement data to the user.

19. The computer storage media of claim 17, wherein the program comprises instructions to further cause the data processing apparatus to perform operations comprising:
receiving one or more filtering criteria from the user including one or more of location filtering or time filtering.

20. The computer storage media of claim 17, wherein computing the engagement score comprises:
determining a weight for each of the one or more social signals, wherein the weight indicates the relative importance of the respective social signal, and wherein the weight is determined dynamically based on all the social signals; and
computing, for each user in the pool of users, a weighted average using all the social signals and respective weights.

21. The computer storage media of claim 17, wherein selecting the plurality of target users further comprises:
generating a plurality of groups of candidate users, each group comprising users having a similar likelihood of engagement; and
receiving a user input selecting a group of the plurality of groups.

22. The computer storage media of claim 21, wherein generating the plurality of groups includes using the promotion value to determine the number of users to include in a group having a particular likelihood of engagement, wherein the number of users in the group is inversely proportional to the likelihood of engagement.

23. The computer storage media of claim 17, wherein each user in the pool of users on the social messaging platform does not have a prior relationship with the user.

* * * * *